Figure 1:
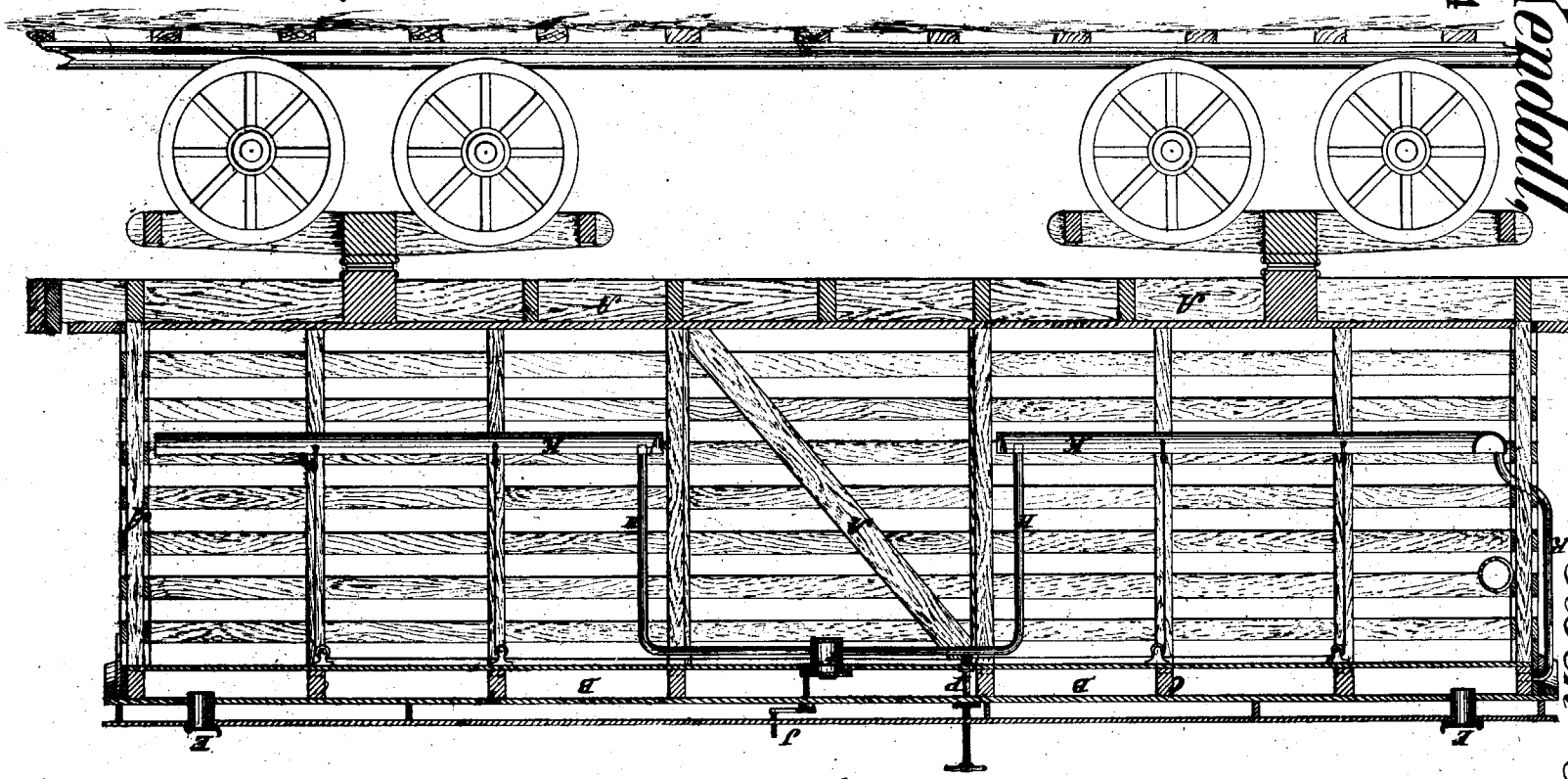

Sheet 1. 2 Sheets

The National Cattle-Car Company,

Assignee of

J. S. Kendall,

REISSUED AUG 15 1871

Stock-Car.

4514

Witnesses:-
Geo. H. Graves,
Geo. H. Fox

John S. Kendall
by his Atty
Wm. G. Baldwin

Sheet 2. 2 Sheets
The National Cattle Car Company,
Assignee of
J. S. Kendall, Fig. 2 Stock-Car.
4514
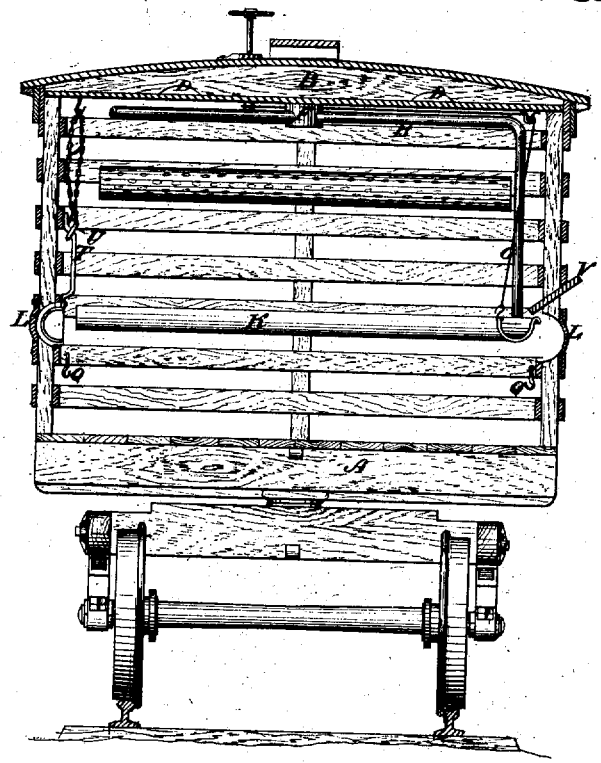
Fig. 3
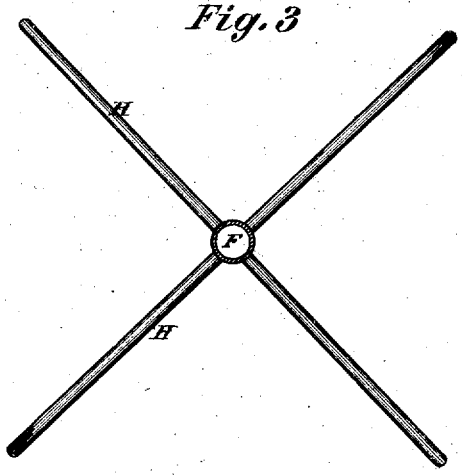
Witnesses:-
Wm. H. Rowe
Joel Peyton
Inventor:-
John S. Kendall
by his Atty
Wm. D. Baldwin

UNITED STATES PATENT OFFICE.

JOHN S. KENDALL, OF ST. LOUIS, MISSOURI, ASSIGNOR, BY MESNE ASSIGNMENTS, TO THE NATIONAL CATTLE-CAR COMPANY, OF SALEM, OHIO.

IMPROVEMENT IN RAILWAY STOCK-CARS.

Specification forming part of Letters Patent No. 90,851, dated June 1, 1869; reissue No 4,514, dated August 15, 1871.

*To all whom it may concern:*

Be it known that I, JOHN S. KENDALL, formerly of Northfield, Minnesota, now residing at St. Louis, Missouri, have invented certain new and useful Improvements in Railway Stock-Cars, of which the following is a specification:

The object of the invention herein claimed is to render cattle more comfortable in being transported on railway cars, and thus secure their delivery in good condition and with much less loss of weight than is attendant upon the ordinary method of transporting them long distances without food or water. The first part of my invention herein claimed relates to means for supplying the cattle with food or water; its object is to protect the troughs from injury by the cattle when not in use and to economize car-room; to which end the improvement consists in combining with a railway car a trough so hinged as to swing downward and out of the way when not in use and to swing upward and inward when required to receive food or water. Second, the object of the next part of my invention is to supply the stock with water; and the improvement consists in combining, in a railway stock car, a trough with a water-supply pipe arranged outside of the car so as to be out of the reach of the stock. Third, the object of the next part of my invention is to supply a series of troughs with water and yet leave the door-ways clear for ingress and egress; to which end the improvement consists in combining, in a railway stock-car, drinking-troughs for the stock and supply-pipes passing around the door-ways so as to leave them unobstructed. Fourth, the object of the next part of my invention is to prevent injury to the weaker cattle by the crowding and trampling of the stronger ones; and the improvement consists in combining, in a railway stock-car, a series of vertical elongated staples with rings and chains sliding therein, these parts being so constructed that the cattle, when chained to the staple, can freely move their heads up or down, but can neither lie down to be trampled upon nor rear so as to trample upon the others.

In the accompanying drawing I have shown a a railway stock-car embodying all my improvements. Figure 1 represents a vertical longitudinal central section; Fig. 2, a vertical transverse section; Fig. 3, a view illustrating one arrangement of the water-pipes connecting the tank and troughs.

The body A of the car may be made in any of the ordinary well-known ways. The roof is made double so as to leave a water-tight space, tank, or reservoir, B, in the ceiling of the car. The cross-pieces C in this case not only bind the sides of the car together, but also divide the water-space into compartments, which communicate only through small openings D, Fig. 2. By this mode of construction the water flows freely through all of the compartments, but at the same time is prevented from being violently dashed from one part of the car to another while the train is in motion. The water-tank or reservoir might be located and so arranged in the bottom of the car that the weight of the stock would force the water from the reservoir when desired. The reservoir could also be located in any other part of the car, as at the end or side, and it might constitute a water-space in the car itself, or a tank might be attached to the car so as to be transported with it, and water might be drawn from it. Water flows into the tank through inlets E, and out of it, through an outlet-valve, F, to troughs K, the valve being regulated by a crank, J, operated from the outside of the car. Troughs K are arranged in the car at any place suitably accessible to the stock; but I prefer to arrange them at the sides or ends of the car, as shown in the drawing. In order to adjust the troughs for use, and readily to remove them when not in use, I hinge them to the walls of the car in such manner that they can be swung outward into the proper position for holding water or back into a recess in the side of the car and be fastened therein out of the way when not in use. I find it better to arrange the troughs to swing downward than upward; for when swung up the cattle, when hungry or thirsty, constantly try to turn the troughs down, and so injure them on their attachments. The recesses in the sides of the car are formed by making the standards of the car-body in sections, firmly united by bent metal straps L. The troughs are raised or lowered by chains O attached to them and extending upward to a winding-shaft or roller, P. The best place from which to operate this shaft is the top of the car, and I accordingly arrange the shaft vertically, as shown in the drawing, for this purpose. A latch on the trough falls into a catch, Q, and holds the trough when lowered in its recess. The water-pipes H may be connected with the reservoir at any suitable place, and may be conducted either inside or outside of the car to the troughs. They are less liable to be injured or destroyed by the stock when arranged outside of the car, as at R. A staple, T, is secured vertically against the side of the car, to which the ring of a chain, U, is attached for fastening the stock. Each animal can raise or lower its head by moving the ring of its chain up or down in its staple, but the construction is such that the animal can neither lie down nor raise its head sufficiently high to mount other animals in the car. These conditions are essential to the successful transportation of stock, for the weaker animals are liable to be trampled upon by the stronger ones. Feeding-boards V pass through the car and are inclined inward and downward toward the troughs above which they are arranged, thus serving to convey food to the stock.

The details of construction of the tank and sprinkler are described in Letters Patent granted to my assignees, Kendall, Emerson, and Talcott, May 25, 1869, both the patent of which this is a reissue and the one above mentioned being divisions of one application.

I claim as my invention—

1. The troughs hinged to the side of the car so that they can be turned down out of the way when not in use, substantially as herein described.

2. The combination, in a railway stock-car, of a trough with a supply-pipe arranged outside of the car so as to be out of reach of the stock, substantially as hereinbefore set forth.

3. The combination, with a railway stock-car, of troughs divided by the door-ways and supply-pipes passing around the door-ways, substantially as hereinbefore set forth, to supply the troughs without obstructing the door-ways.

4. The combination, with a railway stock-car, of the staples, the rings sliding on the staples, and the fastening-chains, these members being constructed and operating, substantially as hereinbefore set forth, to prevent the cattle from rearing or lying down, while leaving them free to move comfortably.

JNO. S. KENDALL.

Witnesses:
TOM B. SEAVEY,
MADISON BABCOCK.